United States Patent
Douma et al.

(10) Patent No.: US 6,480,440 B2
(45) Date of Patent: Nov. 12, 2002

(54) SEISMIC RECEIVER MOTION COMPENSATION

(75) Inventors: Jan Douma; William H. Dragoset, both of Houston, TX (US)

(73) Assignee: Westerngeco, L.L.C., Houston, TX (US)

( * ) Notice: Subject to any disclaimer, the term of this patent is extended or adjusted under 35 U.S.C. 154(b) by 35 days.

(21) Appl. No.: 09/801,377

(22) Filed: Mar. 7, 2001

(65) Prior Publication Data

US 2002/0126576 A1 Sep. 12, 2002

(51) Int. Cl.$^7$ .............................. G01V 1/38; G01V 1/00; G01V 1/28; G06F 19/00
(52) U.S. Cl. ............................................. 367/21; 702/6
(58) Field of Search ................................ 367/21; 702/6

(56) References Cited

U.S. PATENT DOCUMENTS 5,050,129 A     9/1991   Schultz ......................... 367/21

OTHER PUBLICATIONS

Effects of Source and Receiver Motion on Seismic Data, Gary Hampson and Helmut Jakubowicz (Texaco Ltd., England), 1990 SEG, pp. 859–862.
The Effects of Source and Reciever Motion on Seismic Data, Gary Hampson and Helmut Jakubowicz, Geophysical Prospecting, 1995, 43, 221–224.
Marine Vibrator Motion Correction in the Frequency–Space Domain, Tony Noss, Graham Johnson, Shuki Ronen (Schlumberger) and Paul Allen, Mike Jenkerson, Rich Houck (Mobile); 1999 SEG, 4 Pages.
Marine Vibrators and the Doppler Effect, William H. Dragoset, Jr. (Western Atlas International, Inc.), 1988, pp. 75–78.
Simple Theory for Correction of Marine Vibroseis Phase Dispersion, Philip S. Schultz, Andrew W. Pieprzak, Graham R. Johnson, Leon Walker (GECO), 1989, pp. 660–662.

*Primary Examiner*—Gregory J. Toatley, Jr.
(74) *Attorney, Agent, or Firm*—Steven L. Christian

(57) ABSTRACT

A method of compensating for seismic receiver motion in a marine seismic survey wherein at least one receiver is towed behind a moving seismic vessel comprises producing an acoustic energy wave at a seismic source, and recording the reflection arrival time $t_2$ of the acoustic energy wave at the one receiver. The offset x between the source and the one receiver is determined. The normal moveout velocity V for the acoustic energy, and the velocity $V_B$ of the seismic vessel are also estimated. A corrected reflection arrival time $t_1$, of the acoustic energy wave is then determined by applying a time correction to the recorded reflection arrival time $t_2$. The time correction is a function of the offset x, the normal moveout velocity V, and the velocity $V_B$ of the seismic vessel. The method is applicable to a plurality of receivers, whether the receivers are arranged in a single sensor acquisition system or hardwired to form receiver groups.

8 Claims, 5 Drawing Sheets

SEISMIC RECEIVER MOTION COMPENSATION

BACKGROUND OF THE INVENTION

1. Field of the Invention

This invention relates generally to marine seismic data acquisition, and more particularly to the compensation of seismic receiver motion during such data acquisition.

2. Description of the Related Art

Seismic surveying is utilized to define subsurface geology and thereby improve the likelihood of successfully drilling into a subsurface formation that contains recoverable hydrocarbons. Surveys may be taken over land or sea, and typically involve the generation of a seismic wave via an explosion, impact, or vibration triggered at the surface by a seismic source. The structure of a subsurface formation is mapped by measuring the times required for the seismic wave to return to a plurality of receivers at the surface after having been reflected from interfaces between various subsurface formations, also known as sediment layers, having different physical properties. Variations in the reflection times from one receiver to another on the surface generally indicate structural features in the strata below the receivers.

Once seismic energy waves begin propagating from a seismic source, the waves are independent of the source and become dependent only on the medium through which the waves are conveyed. This medium is effectively stationary, whether the seismic operation is on land or at sea. Thus, seismic energy waves generated in a marine operation propagate through a stationary medium and are then recorded by a moving receiver. This produces a distortion in the recorded seismic data. The distortion is illustrated by considering a streamer cable carrying seismic receivers behind a marine vessel moving at 2.25 m/sec. A seismic wave reflection arriving 4 seconds after the "shot" from the seismic source will be recorded by seismic receivers that have moved 9 meters away from their location at the time of the shot. Since the nominal receiver location would be their location at the time of the shot, an error of 9 meters in offset and 4.5 meters in midpoint is introduced by the receiver motion.

Source motion has long been recognized as a Doppler shift problem for marine vibrators, but has generally been regarded as negligible for impulsive sources such as marine air guns. However, it is now realized that the effects of receiver motion cannot be neglected. The receiver motion is the same regardless of the source, and is more significant with 3D and 4D data.

To address this problem, it is a principal object of the present invention to provide a time-variant static correction to compensate for the effects of receiver motion in marine seismic surveying.

It is a further object that the correction be offset-dependent.

SUMMARY OF THE INVENTION

The objects described above, as well as various other objects and advantages, are achieved by a method of compensating for seismic receiver motion in a marine seismic survey wherein at least one receiver is towed behind a seismic vessel. The method comprises producing an acoustic energy wave at a seismic source, and recording the reflection arrival time $t_2$ of the acoustic energy wave at the one receiver. The offset x between the source and the one receiver is determined. The normal moveout velocity V for the one receiver relative to the source, and the velocity $V_B$ of the seismic vessel, are also determined. A corrected reflection arrival time $t_1$ of the acoustic energy wave is then determined by applying a time correction to the recorded reflection arrival time $t_2$. The time correction is a function of the offset x, the normal moveout velocity V, and the velocity $V_B$ of the seismic vessel.

In a particular embodiment of the present invention, the one receiver is towed by the seismic vessel towards the source, and the corrected reflection arrival time $t_1$ is determined according to the equation:

$$t_1 = t_2 + x(V_B + V^2).$$

In another embodiment of the present invention, the one receiver is towed by the seismic vessel away from the source, and the corrected reflection arrival time $t_1$ is determined according to the equation:

$$t_1 = t_2 - x(V_B/V^2).$$

In a typical application of the present invention, the source is an air gun or an array of air guns and the one receiver is a hydrophone.

The method is applicable to a plurality of receivers, whether the receivers are arranged in a single sensor acquisition system or hardwired to form receiver groups.

BRIEF DESCRIPTION OF THE DRAWING(S)

The manner in which the present invention attains the above recited features, advantages, and objects can be understood with greater clarity by reference to the preferred embodiment(s) thereof which are illustrated in the accompanying drawings.

It is to be noted however, that the appended drawings illustrate only typical embodiment(s) of this invention and are therefore not to be considered limiting of its scope, for the invention may admit to other equally effective embodiments.

DETAILED DESCRIPTION OF THE INVENTION

Figure 1:
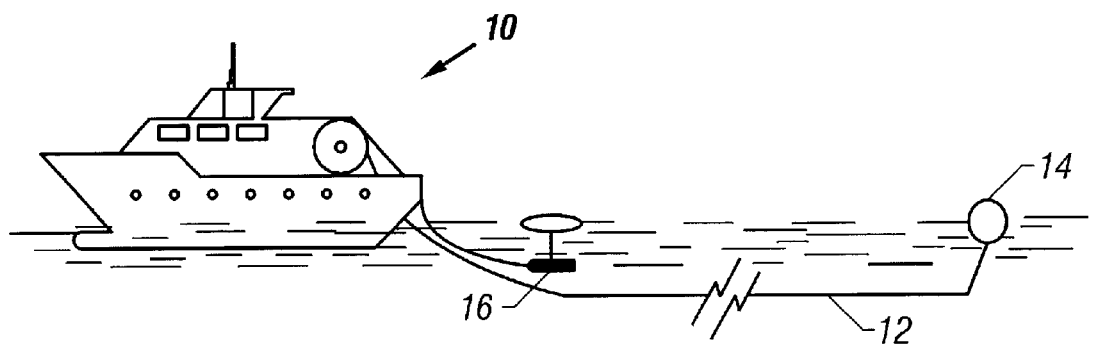
FIG. 1 illustrates a seismic survey vessel towing a seismic streamer cable for the acquisition of marine seismic survey data.
Figure 2:
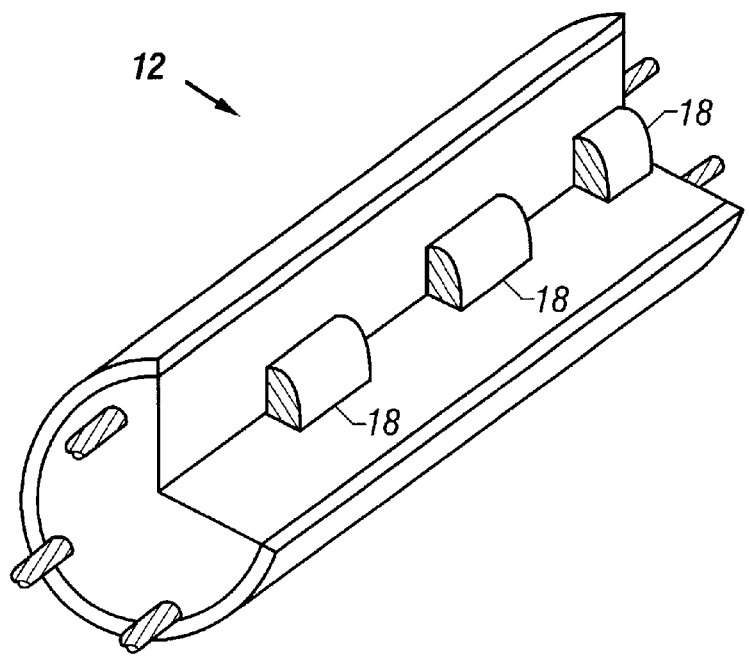
FIG. 2 illustrates the streamer cable of FIG. 1 in quarter section, revealing the hydrophones carried within.

FIGS. 1 and 2 illustrate a typical setup for conducting a seismic survey at sea. An impulsive air gun source 16 is towed behind a seismic vessel 10 to produce acoustic energy pulses that travel through the sea and into the subsea formations before being reflected by sediment layers beneath the sea floor. Receivers 18 called hydrophones are also towed behind vessel 10 in a seismic streamer cable 12 for acquiring the reflected energy waves.

The hydrophones are interconnected by a transmission line (not shown) to a remote recording device located aboard the seismic vessel (also referred to herein simply as a "boat"). In this embodiment, adjacent hydrophones are not wired so as to form groups that generate a single output. Instead, the seismic data acquired by each of the hydrophones 18 are individually digitized and available for subsequent processing, preferably according to a proprietary process owned by the present Applicant and identified as "Q-Marine." These hydrophones 18 are regularly spaced along the length of the action section of streamer 12 and have an average spatial separation interval of approximately 3.125 meters. While the present method is advantageously used in connection with this type of acquisition system, sometimes called a "single sensor" acquisition system, the method does not require the use of such a system. The method may also be used with conventional hardwired groups of seismic sensors.

Streamer cable 12 is secured to the vessel 10 by a lead-in cable that is attached to a cable storage reel located aboard the vessel. A tail buoy 14 is attached to the distal end of the cable by a long stretch of rope or similar material. As the streamer cable is towed through the body of water, air guns 16 are fired and thus generate acoustic energy that travels through the water layer and the geologic formations beneath the ocean bottom. At various reflection points or planes, part of the acoustic energy is reflected back toward the surface. Hydrophones 18 in the streamer cable 12 receive the direct wavefield and any reflected or refracted wavefield traversing the streamer.

Figure 3:
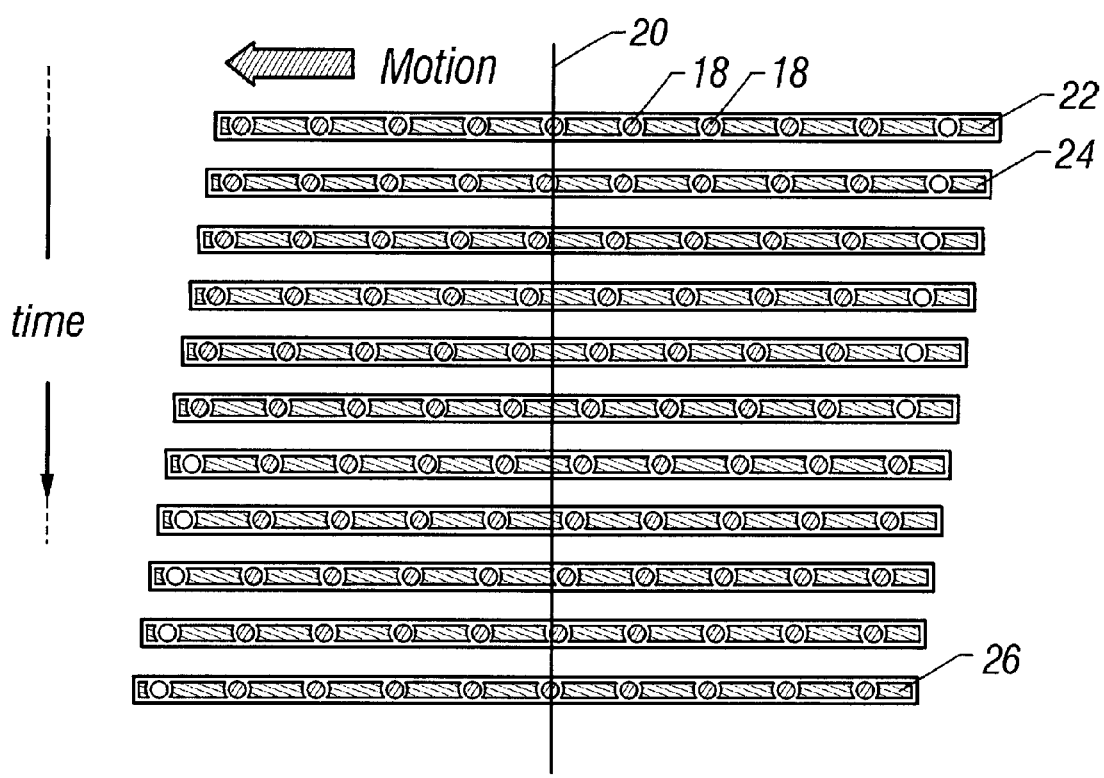
FIG. 3 shows the movement of the hydrophones of FIG. 2 over time as seismic data are acquired.

FIG. 3 shows how the hydrophones shown in FIG. 2 move over time as the seismic data are acquired, and thereby illustrates the problem associated with seismic receiver motion. As marine seismic streamer cable 12 is towed, hydrophones 18 are used to acquire digitized seismic data. Fixed reference position 20 represents a particular X,Y location on the earth's surface. Initial streamer cable position 22 shows that one particular seismic sensor, in this case the fifth hydrophone from the left, happens to be positioned at the fixed reference position 20 when a particular seismic data trace begins to be acquired. Subsequent streamer position 24 shows that after a fraction of a second (here 0.1 second later than the time shown in initial streamer position 22) the fifth hydrophone has moved slightly to the left of the fixed reference position. This hydrophone continues to move in this direction until the point at which the sixth hydrophone from the left is now positioned at the fixed reference position 20 (at a time 1.0 second later than the time shown in the initial streamer position 22). This is shown in FIG. 3 as final streamer cable position 26. In that a seismic data trace will typically be several seconds in length, several hydrophones or hydrophone groups may be located at any particular fixed reference position (at different times of course) while a single set of seismic data traces are being acquired.

The seismic acquisition electronics (either in-sea or onboard the seismic survey vessel 10) will acquire digitized seismic data from each of the hydrophones 18 (or each group of hydrophones), but these seismic data will be associated with moving receiver points, as discussed above. For the single sensor embodiment shown in FIGS. 2 and 3, the receiver points will be the locations of the hydrophones 18 themselves. If hardwired groups of hydrophones 18 are used, the receiver points will be the locations of the hydrophone group centers.

Figure 4:
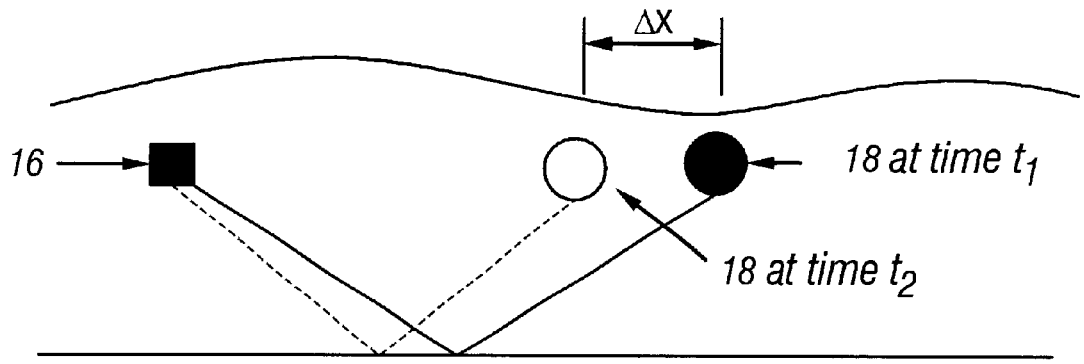
FIG. 4 shows a simplified model that further illustrates the problem of seismic receiver motion over time.

FIG. 4 further illustrates the problem using a model that contains, for simplicity, only a single horizontal reflector plane and a constant velocity medium. Source 16 and hydrophone 18 move at a constant velocity in the same direction (to the left in the figure). Source 16 creates a relatively short, impulsive wavelet as is typical of an air gun. The motion of source 16 may be ignored, at least in a first-order approximation. Hydrophone 18 moves a short distance to the left during the time the wavelet travels from source 16, is reflected from the reflector plane, and arrives at the hydrophone. The solid line represents the raypath of the reflection from source 16 to hydrophone 18 that would be recorded if the hydrophone were stationary during the recording period. The dotted line represents the raypath of the reflection from the source to the moving hydrophone when the reflection is recorded. These events differ in two ways: first the common midpoint (CMP) positions are different; and second, the events have different arrival times because their offsets differ. The offset difference is indicated as $\Delta x$. The magnitude of both effects increases in size as the speed of seismic vessel 10 (i.e., the boat) increases, and (in this simple model) as the recording time increases. This occurs because $$\Delta x = V_B t, \qquad (1)$$

where $\Delta x$ is the distance the receiver moves, $V_B$ is the speed of the boat, and t is the reflection arrival time. In routine marine data processing, neither of these effects (differing CMP positions, different arrival times) is explicitly corrected.

The dotted line in FIG. 4 represents the raypath for the reflection that includes the effect of receiver motion and has a smaller offset than does the stationary case (solid line). The difference in actual offset relative to nominal offset means that the boat motion causes seismic energy to arrive earlier than it would if the source and receiver were stationary.

Suppose that the recorded reflection event in FIG. 4 has an actual (stationary) arrival time $t_1$ and the event is recorded at $t_2$. A first order correction is derived making $t_2$ approximately equal to $t_1$. Because $\Delta x$ is so small compared to the total offset x, the entire correction may be represented as:

$$t_1 = t_2 + 66 \ t. \qquad (2)$$

Figure 5:
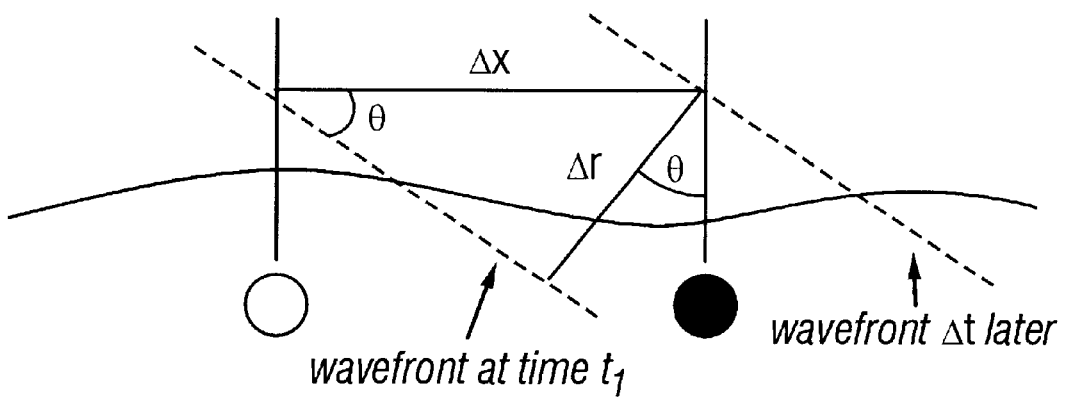
FIG. 5 shows the model of FIG. 4 in greater detail.

FIG. 5 shows a close-up view of the receiver in FIG. 4. The parallel dashed lines represent the wavefront of a reflection event arriving at the receiver with a raypath angle $\theta$ relative to the vertical. A derivation makes the approximation that over the distance $\Delta x$ any wavefront curvature of the event can be ignored. Thus, the difference in raypath length for the stationary and moving receiver situations is:

$$\Delta r = V_W \Delta t, \qquad (3)$$

where $\Delta r$ is the raypath length difference and $V_W$ is the speed of sound in water. Next, combining equations (1) and (3), using the relationship $\sin \theta = \Delta r / \Delta x$, and solving for $\Delta t$ gives the result:

$$t = (V_B / V_W) t \sin \theta. \qquad (4)$$

Consider, now, an infinitely small change in the horizontal coordinate, dx, accompanied by an infinitely small change in travel time, dt. These quantities are related to the orientation of the wavefront by the equation:

$$\sin \theta = V_W (dt/dx). \qquad (5)$$

The derivative in equation (5) can be computed from the normal moveout (NMO) equation, $$t=\{(t_0^2+(x/V)^2\}^{1/2}, \quad (6)$$

as follows:

$$dt/dx=\{(t_0^2+(x/V)^2\}^{-1/2}(x/V^2)=x/(t\,V^2), \quad (7)$$

where V is the normal moveout velocity and $t_0$ is the zero-offset arrival time. Substituting equations (7), (5), and (4) into equation (2) yields:

$$t_1=t_2+x(V_B/V^2). \quad (8)$$

This leads to:

$$\Delta t=t_1-t_2=x(V_B/V^2). \quad (9)$$

Equation (9) is a time correction that can be applied to each trace recorded with the receivers moving in the direction of the source. This time correction, which depends only on offset, boat speed, and normal moveout velocity can be applied trace-by-race. Note that the correction increases as offset or boat speed increases but decreases as normal moveout velocity increases.

Thus, the recorded seismic data may be transformed from moving receiver point based digitized seismic data into stationary receiver point based digitized seismic data by using a time variant and offset-dependent static correction according to equation (9). When the receivers are towed by the seismic vessel towards the source, the corrected reflection arrival time $t_1$ is determined according to the equation:

$$t_1=t_2+x(V_B/V^2). \quad (10)$$

When the receivers are towed by the seismic vessel away from the source, the corrected reflection arrival time $t_1$ is determined according to the equation:

$$t_1=t_2-x(V_B/V^2). \quad (11)$$

Figure 6:
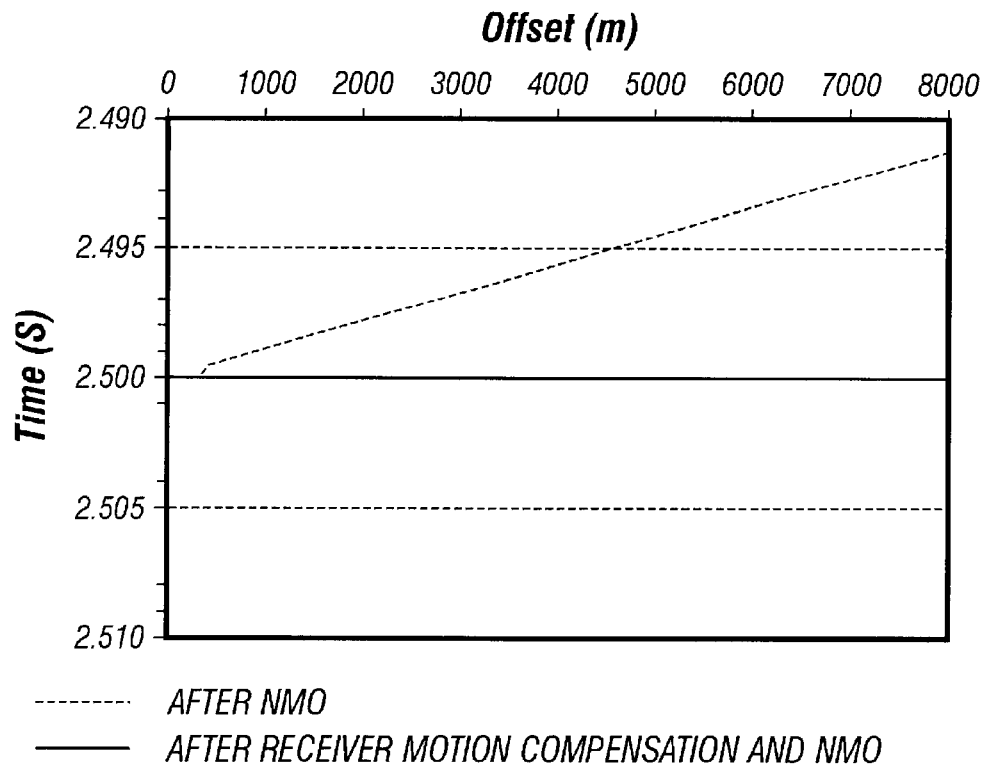
FIG. 6 shows an example of a seismic data correction resulting from the application of the present invention.

Data examples for applying the inventive correction according to equations (9), (10), and (11) will now be provided. In the first example, the sea bottom has a 2.5 second two-way travel time. The receivers move in the direction of the source and the seismic vessel speed is 2.25 m/s (4.4 knots). FIG. 6 shows the sea bottom reflection time after normal moveout correction with the correct velocity (dotted line) and the same data after receiver motion compensation according to the present invention and normal moveout correction (solid line). The latter data are fully aligned for all offsets.

Figure 7:
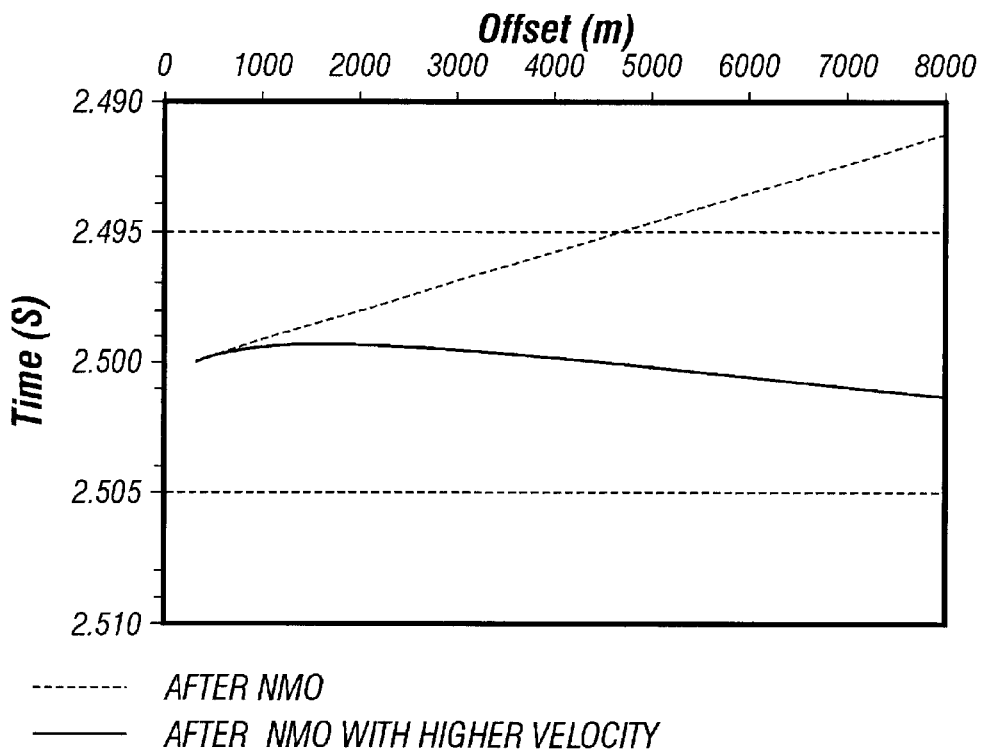
FIG. 7 shows an example of a seismic data correction by using a stacking velocity that is too high.

FIG. 7 illustrates the sea bottom reflection time after the correct normal moveout correction (dotted line) and after a normal moveout correction using a higher stacking velocity (solid line). In this example, in which the present invention is not applied, the application of a stacking velocity that is too high by about two percent substantially compensates for the receiver motion. By picking a higher velocity than the correct velocity, the influence of the receiver motion can be compensated somewhat, but an offset-variant static from −1 to +1 ms will remain.

Figure 8:
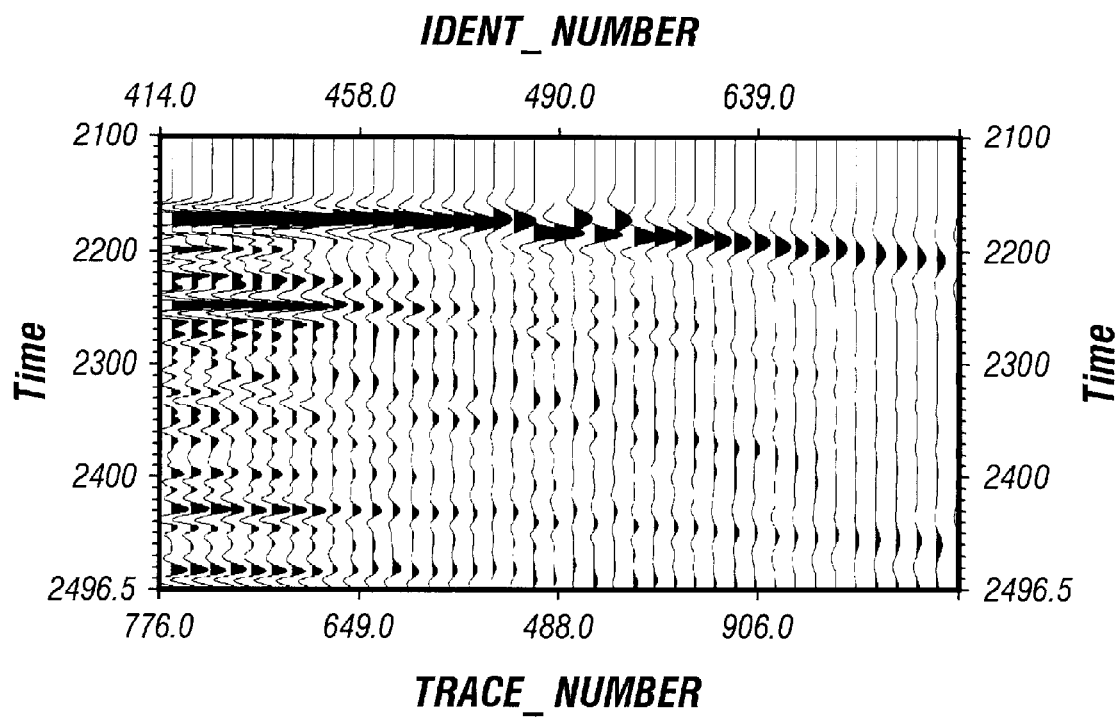
FIG. 8 shows a gather of seismic data illustrating the errors in trace recording times.
Figure 9:
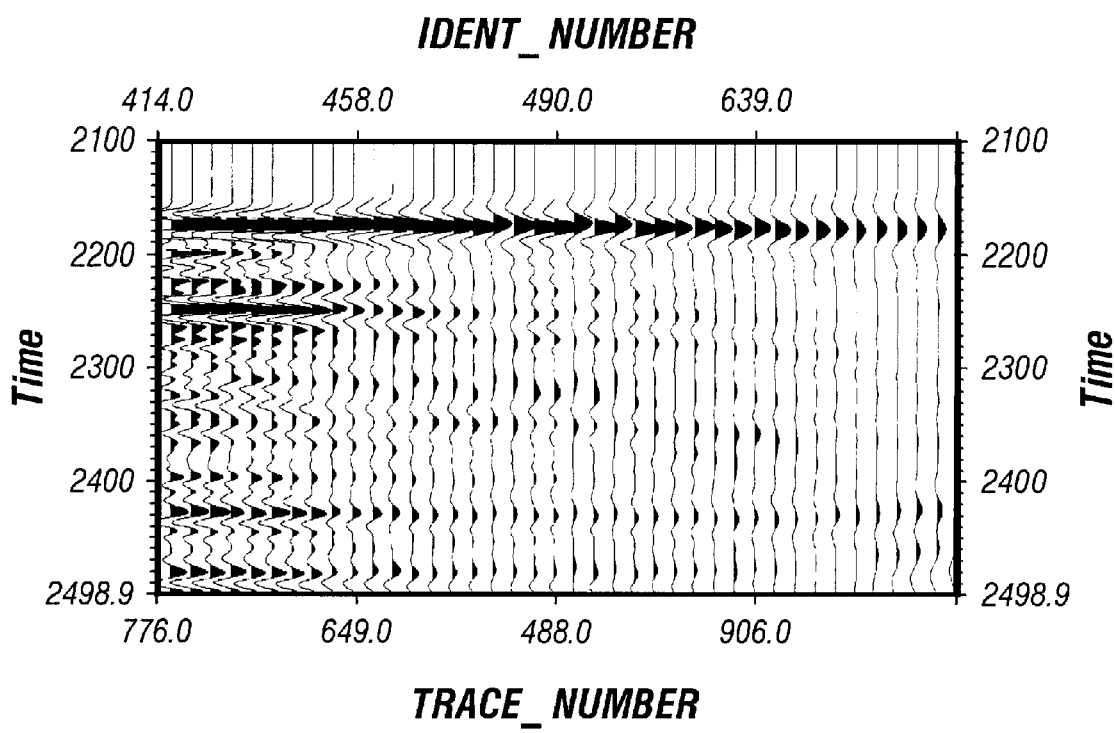
FIG. 9 shows the same data of FIG. 8 after data correction resulting from application of the present invention.

FIG. 8 shows one gather of seismic data that was acquired with two sources on the seismic vessel and two sources on a separate, shooting vessel, positioned at about a streamer length behind the end of the streamer cables. The times of the sea bottom reflection for the traces from the fore sources (nearest offsets) are premature, while the timing for the traces that originate from the aft sources are late. FIG. 9 shows the same data after application of the receiver motion compensation according to the present invention.

Those skilled in the art will appreciate that the application of the present invention is relatively simple and has the advantage that the prestack data after moveout will be aligned. An additional advantage is that the correction according to the inventive method may be postponed until a later stage in the processing of the recorded seismic data such as, for example, when stacking velocities have been derived on a finer grid, resulting in increased accuracy in the receiver motion compensation.

It should also be noted that the method of the present invention has been described herein with the assumption that the receivers and source move substantially in one vertical plane. For 3D configurations that allow for feathering of streamer cables, for example, the receiver motion must be multiplied by the cosine of the angle between the sail direction and the receiver-to-source direction.

In view of the foregoing it is evident that the present invention is well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive. The scope of the invention is indicated by the claims that follow rather than the foregoing description, and all changes which come within the meaning and range of equivalence of the claims are therefore intended to be embraced therein.

What is claimed is:

1. A method of compensating for seismic receiver motion in a marine seismic survey wherein at least one receiver is towed behind a seismic vessel, comprising:

producing an acoustic energy wave at a seismic source;

recording the reflection arrival time $t_2$ of the acoustic energy wave at the one receiver;

determining the offset x between the source and the one receiver;

estimating the normal moveout velocity V for the acoustic energy;

determining the velocity $V_B$ of the seismic vessel; and determining a corrected reflection arrival time $t_1$ of the acoustic energy wave by applying a time correction to the recorded reflection arrival time $t_2$, the time correction being a function of the offset x, the normal moveout velocity V, and the velocity $V_B$ of the seismic vessel.

2. The method of claim 1, wherein the one receiver is towed by the seismic vessel towards the source, and the corrected reflection arrival time $t_1$ is determined according to the equation:

$$t_1=t_2+x(V_B/V^2).$$

3. The method of claim 1, wherein the one receiver is towed by the seismic vessel away from the source, and the corrected reflection arrival time $t_1$ is determined according to the equation:

$$t_1=t_2-x(V_B/V^2).$$

4. The method of claim 1, wherein the source is an air gun.

5. The method of claim 1, wherein the one receiver is a hydrophone.

6. A method of compensating for seismic receiver motion in a marine seismic survey wherein a plurality of receivers is towed behind a seismic vessel, comprising:

producing an acoustic energy wave at a seismic source;

recording the reflection arrival time $t_2$ of the acoustic energy wave at each of the receivers;

determining the offset x between the source and each receiver;

estimating the normal moveout velocity V for the acoustic energy;

determining the velocity $V_B$ of the seismic vessel; and determining a corrected reflection arrival time $t_1$ of the acoustic energy wave for each receiver by applying a time correction to the recorded reflection arrival time $t_2$, the time correction being a function of the offset x, the normal moveout velocity V, and the velocity $V_B$ of the seismic vessel.

7. The method of claim 6, wherein the receivers are arranged in a single sensor acquisition system.

8. A method of compensating for seismic receiver motion in a marine seismic survey wherein a plurality of receivers is towed behind a seismic vessel, the receivers being hard-wired to form receiver groups, comprising:

producing an acoustic energy wave at a seismic source;

determining the reflection arrival time $t_2$ of the acoustic energy wave at the center of each receiver group;

determining the offset x between the source and each receiver group center;

estimating the normal moveout velocity V for the acoustic energy;

determining the velocity $V_B$ of the seismic vessel; and determining a corrected reflection arrival time $t_1$ of the acoustic energy wave for each receiver group center by applying a time correction to the recorded reflection arrival time $t_2$, the time correction being a function of the offset x, the normal moveout velocity V, and the velocity $V_B$ of the seismic vessel.

* * * * *